United States Patent [19]
Ohira et al.

[11] Patent Number: 5,513,880
[45] Date of Patent: May 7, 1996

[54] SLIP ANCHOR FOR SEAT BELT DEVICE

[75] Inventors: Gozo Ohira, Hikone; Masahiro Tanabe, Nagahama; Yutaka Yamaguchi, Hikone, all of Japan

[73] Assignee: Takata Corporation, Tokyo, Japan

[21] Appl. No.: 324,711

[22] Filed: Oct. 18, 1994

[30] Foreign Application Priority Data

Jun. 14, 1994 [JP] Japan ................................. 6-155141

[51] Int. Cl.⁶ ................................. B60R 22/24
[52] U.S. Cl. ........................... 280/808; 297/483
[58] Field of Search ................. 280/808, 801.1, 280/801.2; 297/483, 468; 24/163 R, 164, 198, 199

[56] References Cited

U.S. PATENT DOCUMENTS

| | | | |
|---|---|---|---|
| 3,313,511 | 4/1967 | Koerner et al. | 297/468 |
| 3,924,875 | 12/1975 | Lefeuvre | 297/468 |
| 4,023,826 | 5/1977 | Kokubo et al. | 297/483 |
| 4,508,286 | 4/1985 | Seifert et al. | 280/808 |
| 4,527,313 | 7/1985 | Sylven et al. | 297/483 |
| 4,642,853 | 2/1987 | Plesniarski et al. | 280/808 |
| 4,786,081 | 11/1988 | Schmidt | 280/801.2 |

FOREIGN PATENT DOCUMENTS

| | | | |
|---|---|---|---|
| 0078940 | 5/1983 | European Pat. Off. . | |
| 2228127 | 1/1974 | Germany | 297/468 |
| 3633901 | 4/1988 | Germany . | |
| 4-024147 | 1/1992 | Japan | 280/801.1 |
| 2137072 | 10/1984 | United Kingdom . | |
| 2144971 | 3/1985 | United Kingdom . | |

Primary Examiner—Margaret A. Focarino
Assistant Examiner—Peter C. English
Attorney, Agent, or Firm—Kanesaka & Takeuchi

[57] ABSTRACT

A slip anchor for a seat belt device has a webbing guide portion including a steel plate pivotably mounted on a part of the vehicle body by a fixing portion and a webbing through opening formed in the steel plate by punching. The steel plate as an insert metal is provided with a resin coating at least at the position of the webbing through opening. The webbing through opening of the steel plate has a flange formed at an edge of the opening at least on the side contacting the webbing and a portion of the steel plate under the webbing through opening is provided with a bend for stiffening.

6 Claims, 4 Drawing Sheets

SLIP ANCHOR FOR SEAT BELT DEVICE

BACKGROUND OF THE INVENTION

The present invention relates to a slip anchor for a seat belt device, more particularly, to a slip anchor for a seat belt device which is fixed to an upper portion of a pillar or the like of a vehicle to slidably guide a webbing unwound from a retractor of the seat belt device in a direction which an occupant can easily wear the webbing.

As well known in the art, a seat belt device mounted on a seat or the like of a vehicle restrains an occupant's body from sudden movement by deceleration and impact occurred during a crash to secure the occupant.

Such a seat belt device comprises a webbing (hereinafter, we call a webbing as a woven belt made of a normal fabric which has approximately a 50 mm width and is provided by Japanese Industrial Standard in this specification), a retractor (hereinafter, ELR: Emergency Locking Retractor is designated instead of the retractor) for winding the webbing inside thereof by a biasing force of a spring and for locking the webbing from unwinding only when an impact is applied by a crash to restrain the occupant from moving, a buckle disposed at a proper position so that the webbing fits to the occupant's body, a tongue as a connection member between the buckle and webbing, anchors for fixing the webbing to a predetermined position in the vehicle by a fixing portion such as a bolt, and so on.

The anchors are classified into a fixing anchor and a slip anchor. The fixing anchor is used for fixing the end of the webbing of a lap belt at a position near the floor of the vehicle. The slip anchor is mounted on the upper position of the pillar of the vehicle by a fixing bolt or the like so as to pivot on the fixing bolt in a predetermined direction.

The slip anchor changes the extending direction of the webbing which is unwound upwardly along the pillar from the ELR to a downward direction. The ELR is disposed in the pillar and positioned substantially at the side of the occupant. Thereby, the webbing is guided by the slip anchor as a shoulder belt to stretch over at the front of the occupant's chest when the seat belt is worn. In addition, the slip anchor guides the webbing to be accommodated in the retractor toward the ELR when the seat belt is not worn.

Further, the slip anchor works as a supporting point when the shoulder belt locked from unwinding restrains the occupant from the forward movement, and bears a tensile force from the shoulder belt at a crash. The slip anchor has a guide portion for smoothly guiding the webbing so that the webbing can freely move to and fro and a fixing portion fixed to a frame or the like of the vehicle so as to withstand the force at a crash. In addition, the slip anchor is structured not to be deformed itself when the force is applied.

FIG. 1 (a) and FIG. 1 (b) show an example of a conventional slip anchor. The slip anchor 50 comprises a steel plate 51 made by punching from a steel sheet having a predetermined thickness and a resin guide portion 53 formed by a resin mold using a part of the steel plate 51 as an insert metal thereof.

The steel plate 51 consists of a mounting portion having a fixing hole 51a and a guide portion having a guide slot 52. A portion contacting the webbing of the resin guide portion 53 is molded in a rough circular arc shape (See FIG. 1 (b)). Thereby, the webbing W inserted into the guide slot 52 formed in an elongated hole shape slides smoothly to be guided.

The guide slot 52 has escape areas 52a formed on the both ends thereof. The escape areas 52a prevent the webbing W from twisting and prevent the edge of the webbing from warping when the webbing W is guided through the slip anchor.

The bolt head is covered by a resin cover C for the beauty and the safety.

The slip anchor of such a type shown in FIG. 1 (a) is made by an insert-molding process or the like. That is, the steel plate 51 is buried previously as the insert metal in a predetermined position in a mold and the resin is then injected into the mold. It is preferred to smoothly share the force applied to the slip anchor between the steel plate 51 and the resin portion at a crash or the like.

However, when the steel plate has little rigidity, the steel plate is deformed when a force is applied rapidly to it at a crash or the like so that the resin member can not follow the deformation of the steel plate and is then cracked.

For solving the problem, it is possible to increase the thickness of the plate for increasing the rigidity thereof. However, as the thickness is increased, each interval between the steel plates to be punched should be enlarged satisfactorily when the steel plates are punched from a steel sheet material. Thereby, there is waste of the material on blanking, so that the cost of parts is increased as increasing the thickness of the material.

For holding back the increase of the weight of the vehicle as a whole, it is an important object to lighten the weights of parts for vehicle. In the slip anchor described above, the plate needs to be thickened or expanded in size for increasing the rigidity. As the result of this, the weight of parts is increased and this is a fault of vehicle parts.

SUMMARY OF THE INVENTION

It is an object of the present invention to solve the problems of the prior art as mentioned above and to provide a slip anchor for a seat belt device which is compact and has large rigidity against the force at a crash, wherein cost of production can be lowered.

For achieving the above mentioned object, the present invention provides a slip anchor for a seat belt device having a webbing guide portion comprising a steel plate pivotably mounted on a part of the vehicle body by a fixing portion and a webbing through opening formed in the steel plate by punching, the steel plate as an insert metal having a resin coating at least at the position of the webbing through opening, wherein the webbing through opening of the steel plate has a flange formed at an edge of the opening at least on the side contacting the webbing and a portion of the steel plate under the webbing through opening is provided with a bending portion for stiffening.

The flange is preferably bent to the same direction as the webbing winding direction.

The flange is preferably chamfered for rounding on the bent portion.

The steel plate has preferably a fixing hole formed therein to allow the fixing portion to be insert and a bearing portion to be disposed to the fixing hole is preferably integrally formed by the resin coating.

The resin coating is preferably provided to the steel plate to expose at least a part of the side surface of the steel plate.

According to the present invention, the webbing through opening of the steel plate has a flange formed by burring at an edge of the opening at least on the side contacting the webbing and a portion of the steel plate under the webbing through opening is provided with a bending for stiffening so as to increase the stiffness against the force applied when the webbing is unwound and to increase the section modulus at the portion where the external force is applied. In addition, the present invention can widen the contacting area between the webbing W and the guide portion where the webbing slides so as to prevent the force applied to the steel plate from being locally applied.

Further, the flange is bent to the same direction as the webbing winding direction so as to smoothly transfer the force when the webbing is unwound to the steel plate.

The flange is chamfered for rounding on the bent portion so that the stress is smoothly transmitted from the resin to the steel plate.

Furthermore, the steel plate has a fixing hole formed therein to allow the fixing portion to be inserted and a bearing portion to be disposed to the fixing hole is preferably integrally formed by the resin coating so as to reduce the number of parts and manhours for assembly thereby to lower the production cost of the parts.

The resin coating is provided to the steel plate to expose at least a part of the side surface of the steel plate so as to avoid the concentration of stress on the resin to prevent the crack thereof and further to reduce the amount of the resin used to lower the cost.

DETAILED DESCRIPTION OF THE PREFERRED EMBODIMENTS

Figure 1:
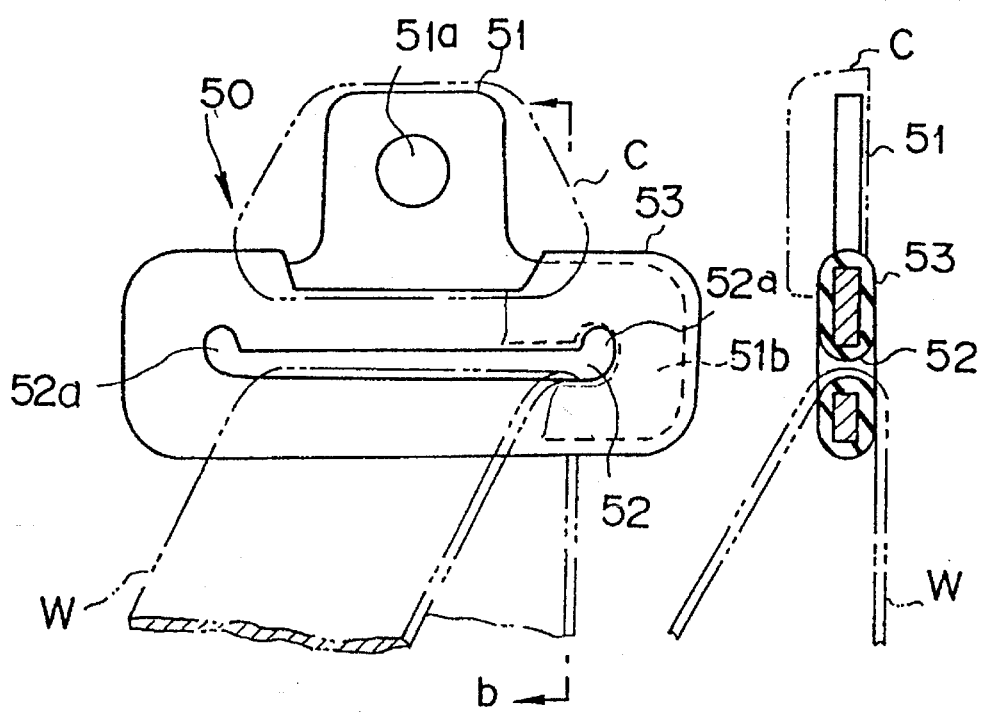
FIGS. 1 (a) and 1 (b) are explanatory views showing an example of a conventional slip anchor for a seat belt device.
Figure 2:
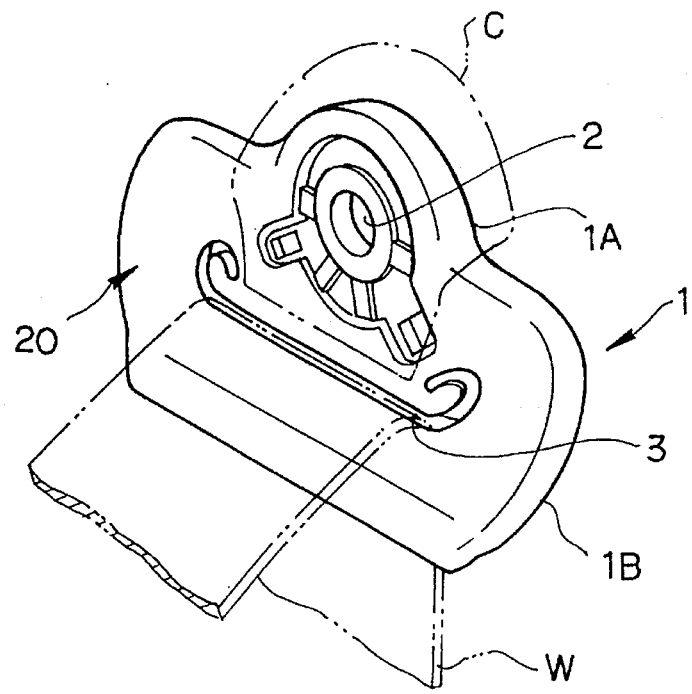
FIG. 2 is a perspective view showing an embodiment of a slip anchor for a seat belt device according to the present invention.
Figure 3:
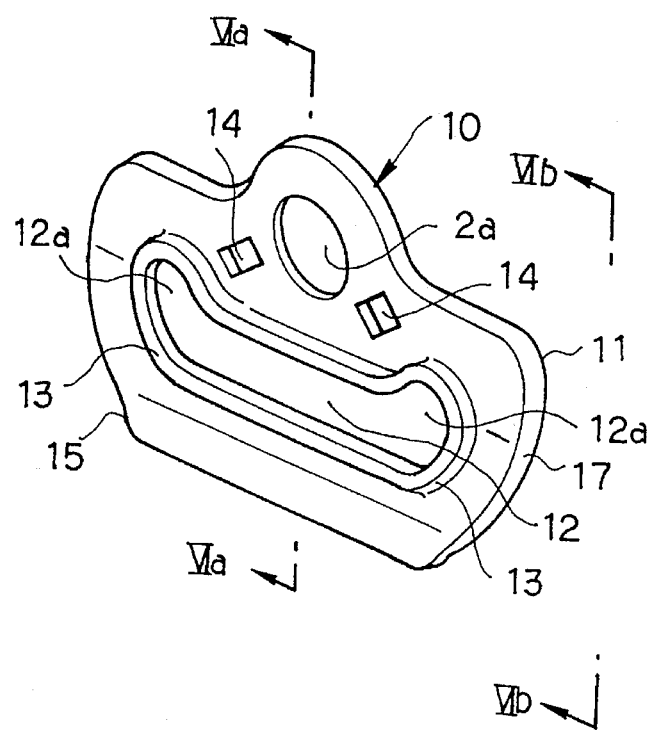
FIG. 3 is a perspective view showing an example of a shape of a steel plate used as a core (an insert metal) of the slip anchor shown in FIG. 2.
Figure 4:
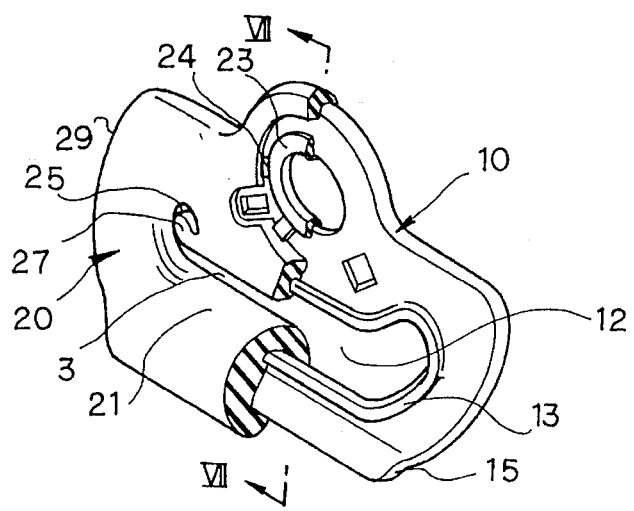
FIG. 4 is a partial sectional view showing a condition of a resin coating on the steel plate shown in FIG. 3.

Referring to FIG. 2 through FIG. 4, the description will now be made as regard to an embodiment of a slip anchor for a seat belt device according to the present invention.

FIG. 2 shows the whole of a slip anchor 1. The slip anchor 1 is a resin molded product coated by a resin coating layer 20 to cover substantially the whole surface of a steel plate 10 as an insert metal as shown in FIGS. 3 and 4. As portions of the slip anchor 1 are named according to their functions, the portions are an anchor fixing portion 1A and a webbing guide portion 1B.

The anchor fixing portion 1A is a portion for fixing the slip anchor 1 to a pedestal portion (not shown) which is a part of a vehicle frame. FIG. 2 shows the condition of the anchor fixing portion 1A which is pivotably supported by a fixing bolt (not shown) inserted into a fixing hole 2 formed in the center of the anchor fixing portion 1A.

On the other hand, the webbing guide portion 1B is a portion for turning the direction of the webbing W hung thereto in a predetermined direction. A webbing through opening 3 is formed in the webbing guide portion 1B. FIG. 2 exemplarily shows the condition that the webbing W is inserted into the webbing through opening 3.

As shown in FIG. 3, the steel plate 10 is a pressed product made by punching from a steel sheet material, then providing a predetermined die bending and providing a flange to it.

Mark "S55C", Grade 10 of Carbon Steel for Machine Structural Use (JIS G4051) having a thickness t=3.2 mm is employed as a steel sheet material used in this embodiment.

Figure 6:
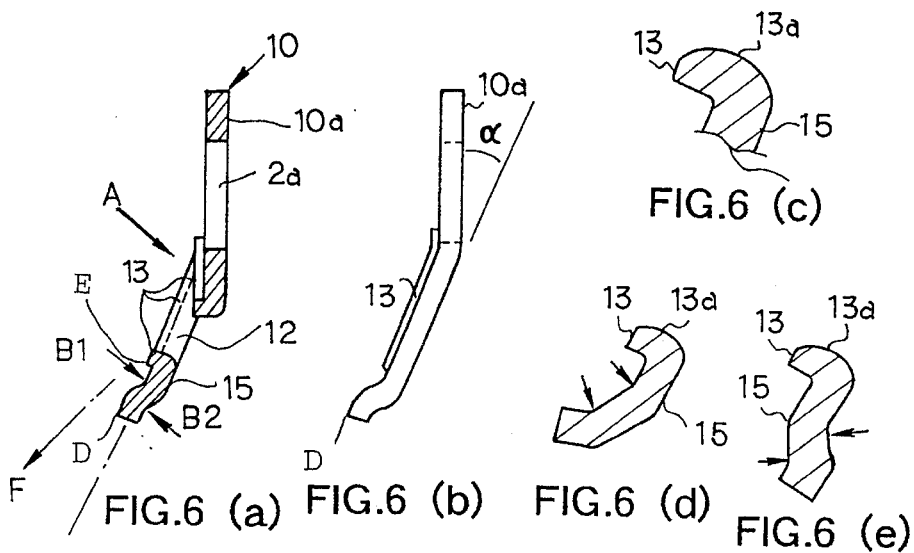
FIG. 6 (a) is a sectional view showing the steel plate taken along the line VIa—VIa shown in FIG. 3, FIG. 6 (b) is an end view taken along the line VIb—VIb, and FIG. 6 (a)–(e) are sectional views showing examples of bending shapes for stiffening the steel plate.

As shown in FIG. 3, a fixing hole 2a is formed in the center of the upper portion of the steel plate 10 so as to be pierced with a mounting bolt (not shown). An opening 12 for inserting the webbing W is formed in a wide area portion 11 under the fixing hole 2a. As shown in FIG. 3 and FIG. 6 (a), the opening 12 is an elongated hole, wherein the height is approximately 10 mm and the width is approximately 60 mm in this embodiment. In addition, the opening 12 has areas each formed in a circle shape, wherein the diameter is 10 mm and disposed upwardly at an angle at both sides 12a thereof.

Further, the opening 12 is provided with a flange 13 by burring the whole edge thereof. The projecting direction of the flange 13 is the same as the unwinding direction of the webbing W. The height of the flange is substantially same as the thickness of the steel plate 10. The flange 13 has a surface 13a at the side where the webbing W is inserted. The surface 13a is chamfered to be a circular arc shape having a predetermined curvature as shown in FIG. 6 (c) as enlarged. Thereby, the stress is smoothly transmitted from the resin coating layer 20 to the steel plate 10 due to the chamfered surface 13a in a case that the flange 13 is integrally molded by the resin coating layer 20 as an insert metal. Though the chamfering is made to have a circular arc shape, it should be understood that the chamfering may be a curved surface curved gently.

Two engaging holes 14 for mounting a resin cover C are disposed on the surface of the steel plate 10. The engaging holes 14 are engaged with pawls (not shown) formed on the resin cover C so that the resin cover C can be mounted to the slip anchor 1 only with one action.

In the plastic working of the steel plate 10, besides the burring, the steel plate 10 is also bent from the direction of the arrow A to have an obtuse angle seen from its side as shown in FIG. 6 (a) and FIG. 6 (b). Furthermore, the lower side plate 15 below the opening 12 is bent from the both directions of the arrows B1 and B2. Because of the bending from the direction of the arrow A, the steel plate 10 is bent to have a bent angle of approximately $\alpha=25°$ relative to the plate mounting surface 10a as shown in FIG. 6 (a), FIG. 6 (b) and FIG. 7. Thereby, the webbing W can be located apart from the end face of the slip anchor in an offset amount d when the slip anchor is mounted (See FIG. 7) so as to prevent the surface of the webbing W from being soiled so that the webbing W is brushed against a part of the vehicle during unwinding or winding of the webbing W.

The lower side plate 15 is bent to be a predetermined shape by die bending for stiffening the plate from the both sides of arrows B1 and B2 so that the lower side plate 15 can be increased in section modulus against the force from the webbing W.

Due to the stiffening of the lower side plate 15, as cooperating with the efficiency of the flange 13 formed on the periphery of the opening 12, the steel plate can be increased in stiffness.

It should be understood that the direction and angle of bending the steel plate 10 is not confined to that shown in FIG. 6 (*a*). The steel plate 10 is increased in section modulus even by being formed in a bending shape as shown in FIG. 6 (*d*) and FIG. 6 (*e*).

Though the flange 13 formed on the periphery of the opening 12 is formed whole around the opening 12 in FIG. 3, the flange 13 may formed on the periphery of the opening only at the lower side plate 15 on the guide surface side for sliding the webbing.

The description will now be made as regard to the characteristic of a strength of the flange 13 of the webbing through opening 3 of the steel plate 10 when an external force is applied to the slip anchor 1 from the webbing W.

The webbing through opening 3 of the slip anchor 1 according to the present invention is provided with a flange by burring. Thereby, the stiffness against a deformation in the webbing unwinding direction is increased and the contact area between the webbing W and the webbing through opening 3 during sliding of the webbing W becomes wider. Thereby, the resistance against deformation of the steel plate 10 is increased without increasing the thickness of the steel plate 10.

In the slip anchor according to the present invention, the steel plate shown in FIG. 3 is provided by a punching (shearing). It was confirmed experimentally that, as a tensile force is applied to a rupture part of cutting surface, that is, a part where the crystal grain appears roughly by the breaking due to a shearing at a rear edge of the cutting surface, the strength of the rupture part is locally reduced.

For overcoming this problem, in the present invention, the burring is conducted while considering the surface contacted by a punch of a blank so that the rupture part of the cutting surface is positioned opposite to the side of the flange 13 of the opening 12 where the webbing is inserted into.

That is, as an explanation will now be made from a view point of a relation with a direction of applying a force, the direction of force applied from the webbing to the slip anchor when the occupant usually wears the seat belt device is exemplarily illustrated by the arrow F shown in FIG. 6 (*a*). Though the angle is slightly changed when an impact is applied at a crash or the like according to the bending angle of the plate shown in FIG. 6 (*a*), it is confirmed that the force is generally applied in the direction of the arrow F.

For the above reason, the rupture part of the cutting surface E is positioned at the outer end of the flange 13 as shown in FIG. 6 (*a*) relative to the direction of the arrow F shown in the same figure. Thereby, the rupture part of the cutting surface E is positioned under the compressive stress against substantially all directions applied by forces so as to prevent the portion provided with the flange by burring from reducing the strength thereof. "D" indicates shearing drop side of the cutting surface of the steel plate.

Figure 5:
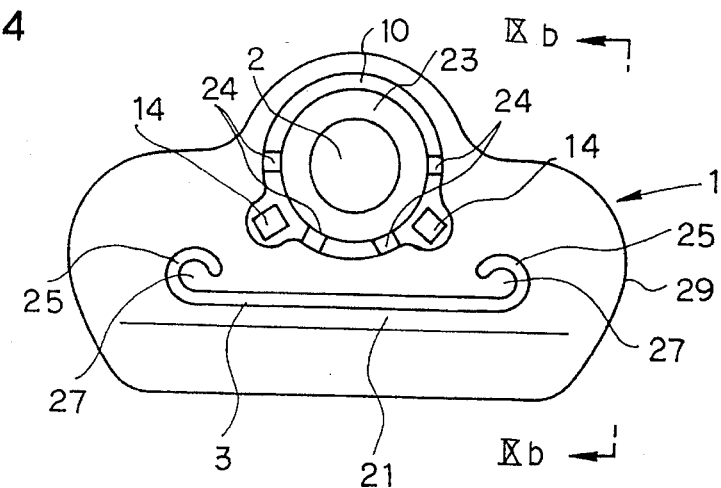
FIG. 5 is a front view of the slip anchor shown in FIG. 2.
Figure 7:
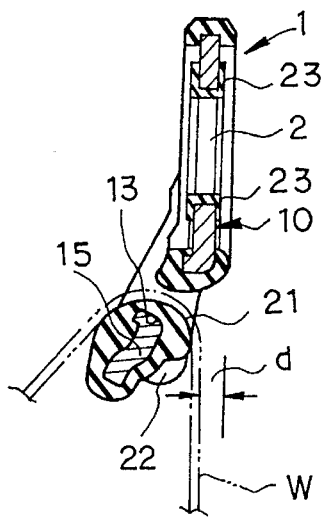
FIG. 7 is a sectional view showing the slip anchor taken along the line VII—VII of FIG. 4.

Referring to FIG. 4, FIG. 5 and FIG. 7, the description will now be made as regard to the structure of the resin coating portion of the slip anchor.

The resin coating layer 20 is provided by coating substantially the whole surface of the steel plate 10 as an insert metal as shown in FIG. 4.

In this embodiment, polyacetal (POM) which is a thermoplastic resin is employed as a resin for coating. Since polyacetal has a high mechanical strength, small creep deformability and small coefficient of friction, polyacetal is preferably employed as a coating resin for the slip anchor provided with the webbing guide portion. Polyamide resin (PA), polyethylene having high density or the like is also preferably employed. Further, a various kind of material having not only high mechanical strength but also high wear resistance may be also employed.

The section of the resin coating has a sliding guide surface 21 having large radius of curvature which is formed so as to slidably turn the webbing W sliding as shown in FIG. 7. As apparent from FIG. 7, the flange 13 disposed on the periphery of the opening 12 of the steel plate 10 and the portion for stiffening disposed on the lower side plate 15 are disposed to be the core of the resin coating layer 20.

For economizing the resin material and lightening the parts, a hollow portion 22 stiffened by ribs is formed in a portion opposite to the webbing guide surface 21 wherein force is not directly applied from the webbing W.

In this embodiment, for reducing the number of parts for the slip anchor, a shoulder bearing which is separately provided from the resin coating in the prior art is formed with the resin coating at a time. In the prior art, the shoulder bearing is a resin part formed in a facing ring shape and mounted to be positioned between bolts in the bolt fixing hole of the steel plate. The shoulder bearing is mounted for insulating noises produced when the slip anchor pivots about the fixing bolt and for preventing the part from wearing.

According to the present invention, a shoulder bearing 23 formed in a ring shape is molded on an inner periphery of the fixing hole with the resin coating at a time as shown in FIG. 4 and FIG. 5 so as to reduce the number of parts and manhours for assembly. As illustrated in FIG. 7, the coating thickness of the shoulder bearing 23 may be thinner than the other coated portions.

The shoulder bearing 23 is supported in its position by bridges 24 integrally molded therewith at some places on the both surfaces of the plate (See FIG. 5).

Referring to FIG. 5, the description will now be made as regard to a configuration of the webbing through opening 3 of the slip anchor coated by the resin. The height of the webbing through opening 3 is approximately 1.9 times of the thickness of the webbing so as to prevent the webbing from twisting not to be doubled or be turned over.

As already disclosed by the applicant, escape areas 25 are formed in a rough U-shape and disposed at the both sides of the webbing through opening 3. For forming the escape areas 25, resin projections 27 are formed at the connecting portions between the position where the webbing is inserted and the escape areas 25, respectively. Each of the resin projections 27 is formed to orient slightly upwardly at an angle. The resin projections 27 guide the webbing in a slightly upward direction to escape when one of the side edges of the webbing W is about to touch the end wall of the webbing through opening 3 in case that the slip anchor shakes rightward or leftward relative to the webbing unwinding direction when the webbing W is unwound. In this manner, the resin projections 27 prevent the side edges of the webbing W from wearing or becoming fluffy by touching the resin surface.

As apparent from FIG. 5, the configuration of the opening 12 of the steel plate 10 is decided taking the escape areas 25 into consideration. Therefore, the configuration of the opening 12 can be changed according to the configuration of the resin coating layer 20. In this case, it is preferable to form the flange 13 all around the edge of the opening or on the side where the webbing slides in the opening to increase the stiffness of the steel plate 10.

Figure 8:
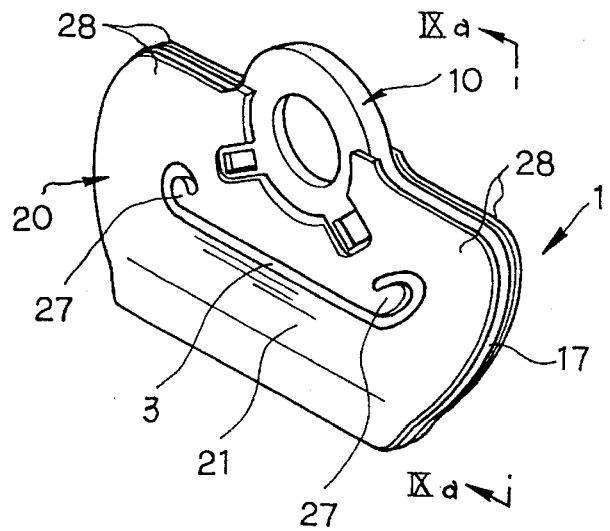
FIG. 8 is a sectional view showing another embodiment of the slip anchor.
Figure 9:
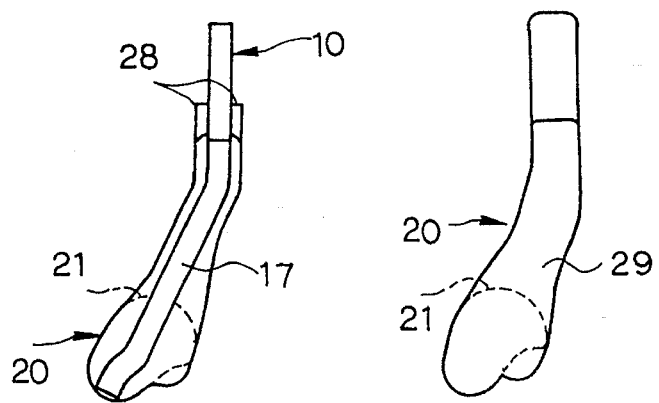
FIG. 9 (a) is an end view of the slip anchor taken along the line IXa—IXa of FIG. 8 and FIG. 9 (b) is an end view of the slip anchor taken along the line IXb—IXb of the FIG. 5.

Referring to FIG. 8 and FIG. 9, the description will now be made as regard to an example in which the resin coating layer 20 is provide to the steel plate 10 except a part thereof as another embodiment according to the present invention.

In the slip anchor shown in FIG. 2, the resin coating layer 20 is provided to substantially the whole surface of the steel plate 10 so that the steel plate 10 can work against the force with the resin coating layer 20 integrally. However, the steel plate expands and contracts slightly by repetition of temperature change even without applied force. When the resin cannot follow by the expansion and contraction of the steel sheet, a crack may be produced at a portion where a concentration of stress occurs.

Then, the slip anchor 1 shown in FIG. 8 has the resin coating layer 20 which is not provided on the side portion of the steel plate 10. As shown in FIG. 8, though the sectional configuration of the resin coating layer 20 is same as the configuration shown in FIG. 2 about the webbing through opening 3, the steel plate 10 is sandwiched between the resins 28 to expose the side surface 17 of the steel plate 10.

Accordingly, in the slip anchor 1 according to this embodiment, the side surface 17 of the steel plate 10 is appeared as shown in FIG. 9 (a) showing the end surface of the slip anchor 1. As the result of this, the slip anchor of this embodiment can reduce the amount of resin as compared with the slip anchor in which the side surface 29 is coated as whole. In addition the slip anchor of this embodiment can prevent the deterioration of the products produced by a crack on the resin.

It should be understood that the range without the resin coating in the side, surface of the steel plate is not confined to the whole of the side surface of the steel plate as shown in FIG. 9 (a) and may be the parts of the side surface which allows to avoid the concentration of stress on the resin to prevent the crack thereof.

Though the above description is made as regard to the examples as a slip anchor for a seat belt device in use for the shoulder anchor, that is, one fixed at the pillar position of the vehicle, the structure according to the present invention can be applied to a tongue for connecting and fixing the webbing to a buckle so as to increase the mechanical characteristic of the tongue and lower the production cost.

As apparent from the above description, according to the present invention, the steel plate is provided with a predetermined plastic working to increase the section modulus of the parts and increase the stiffness against a force so as to produce a compact product with a small amount of the resin, thereby to improve the feeling for using and significantly reduce the production cost of the parts.

What is claimed is:

1. A slip anchor for a seat belt device with a webbing, comprising, a metal plate including a fixing portion for pivotally fixing the metal plate to a vehicle body, a webbing through opening situated near the fixing portion for allowing the webbing to pass therethrough, a flange integrally formed with the metal plate and completely surrounding the webbing through opening immediately outside the opening, and a lower portion located under the webbing through opening, said lower portion having a bending portion extending parallel to the webbing through opening to stiffen the lower portion, said bending portion having two bent sections so that upper and lower sections of the lower portion relative to the bending portion are arranged substantially parallel to each other, and a resin coating formed on the metal plate at least around the webbing through opening.

2. A slip anchor according to claim 1, wherein said metal plate has a front surface facing in a webbing unwinding direction, said flange being bent toward the webbing unwinding direction.

3. A slip anchor according to claim 2, wherein said metal plate includes side portions located on both sides of the webbing through opening, said side portions being bent toward the webbing unwinding direction.

4. A slip anchor according to claim 3, wherein said flange is chamfered on a side of the webbing through opening.

5. A slip anchor according to claim 1, wherein said fixing portion includes a fixing hole formed in the metal plate and a bearing portion situated in the fixing hole, said bearing portion having bridges connected to the resin coating.

6. A slip anchor according to claim 1, wherein said resin coating is formed on the metal plate so that at least a part of a side surface of the metal plate is not covered by the resin coating to prevent formation of a crack in the resin coating by expansion of the metal plate.

* * * * *